United States Patent
Milne

(10) Patent No.: US 10,702,952 B2
(45) Date of Patent: Jul. 7, 2020

(54) METHOD OF LASER SCRIBING FIRST AND SECOND TRANSPARENT ELECTRICALLY CONDUCTIVE LAYERS DEPOSITED ON RESPECTIVE OPPOSING FIRST AND SECOND SURFACES OF A TRANSPARENT SUBSTRATE

(71) Applicant: M-SOLV LTD., Oxford (GB)

(72) Inventor: David Charles Milne, Chipping Norton (GB)

(73) Assignee: M-SOLV LITD., Oxford (GB)

( * ) Notice: Subject to any disclaimer, the term of this patent is extended or adjusted under 35 U.S.C. 154(b) by 461 days.

(21) Appl. No.: 15/502,254

(22) PCT Filed: Jul. 21, 2015

(86) PCT No.: PCT/GB2015/052105
§ 371 (c)(1),
(2) Date: Feb. 7, 2017

(87) PCT Pub. No.: WO2016/020641
PCT Pub. Date: Feb. 11, 2016

(65) Prior Publication Data
US 2017/0225272 A1   Aug. 10, 2017

Related U.S. Application Data

(60) Provisional application No. PCT/GB2015/052105, filed on Jul. 21, 2015.

(30) Foreign Application Priority Data

Aug. 8, 2014   (GB) .................................. 1414108.9

(51) Int. Cl.
*B23K 26/57* (2014.01)
*B23K 26/06* (2014.01)
(Continued)

(52) U.S. Cl.
CPC .......... *B23K 26/57* (2015.10); *B23K 26/0619* (2015.10); *B23K 2103/172* (2018.08);
(Continued)

(58) Field of Classification Search
CPC ............................ B23K 26/57; B23K 26/0619
See application file for complete search history.

(56) References Cited

U.S. PATENT DOCUMENTS

| 2008/0129317 A1 | 6/2008 | Oba |
| 2008/0233715 A1* | 9/2008 | Liu ..................... H01L 31/0465 |
| | | 438/463 |

(Continued)

FOREIGN PATENT DOCUMENTS

| DE | 102008038118 A1 | 2/2010 |
| GB | 2 457 720 A | 8/2009 |

(Continued)

*Primary Examiner* — Serkan Akar
*Assistant Examiner* — Ahmad Abdel-Rahman
(74) *Attorney, Agent, or Firm* — Harness, Dickey & Pierce, P.L.C.

(57) ABSTRACT

The present application describes a method for laser scribing first and second transparent electrically conductive layers (14, 14') deposited on respective opposing first and second surfaces (12, 13) of a transparent substrate (11), the method comprising: directing a first laser beam (21) through one or more lenses (22) to a focal spot on or closely adjacent to the first surface (12) of the substrate (11), such that the focusing laser beam (21) passes through the second electrically conductive layer (14') and the second surface (13) of the substrate (11); initiating relative movement between the first laser beam (21) and the substrate (11) in two axes in a plane orthogonal to the axis of the first laser beam (21) to scribe a first pattern in the first electrically conductive layer (14); directing a second laser beam (21') through one or more lenses (22') to a focal spot on or closely adjacent to the second surface (13) of the substrate (11), such that the
(Continued)

focusing laser beam (21') passes through the first electrically conductive layer (14) and the first surface (12) of the substrate (11), initiating relative movement between the second laser beam (21') and the substrate (11) in two axes in a plane orthogonal to the axis of the second laser beam (21') to scribe a second pattern in the second electrically conductive layer (14').

12 Claims, 3 Drawing Sheets

(51) Int. Cl.
  *B23K 103/00* (2006.01)
  *B23K 103/16* (2006.01)

(52) U.S. Cl.
  CPC ...... *B23K 2103/42* (2018.08); *B23K 2103/50* (2018.08); *B23K 2103/54* (2018.08)

(56) References Cited

U.S. PATENT DOCUMENTS

| | | | |
|---|---|---|---|
| 2010/0320401 A1* | 12/2010 | Tsukihara | H01L 21/268 250/492.1 |
| 2011/0000898 A1* | 1/2011 | Rumsby | B23K 26/0665 219/121.72 |
| 2012/0028404 A1* | 2/2012 | Frey | B23K 26/0624 438/80 |
| 2012/0169664 A1* | 7/2012 | Milne | B23K 26/40 345/174 |
| 2012/0301978 A1* | 11/2012 | Tachibana | H01L 31/046 438/14 |
| 2014/0202742 A1 | 7/2014 | Jones et al. | |
| 2015/0370374 A1* | 12/2015 | Chan | H05K 3/027 174/255 |

FOREIGN PATENT DOCUMENTS

| | | |
|---|---|---|
| GB | 2472613 A | 2/2011 |
| GB | 2509985 A | 7/2014 |
| JP | H07-320637 A | 12/1995 |
| WO | WO-2011-018595 A2 | 2/2011 |

\* cited by examiner

METHOD OF LASER SCRIBING FIRST AND SECOND TRANSPARENT ELECTRICALLY CONDUCTIVE LAYERS DEPOSITED ON RESPECTIVE OPPOSING FIRST AND SECOND SURFACES OF A TRANSPARENT SUBSTRATE

CROSS REFERENCE TO RELATED APPLICATIONS

This application is a U.S. National Phase Application under 35 U.S.C. 371 of International Application No. PCT/GB2015/052105 filed on Jul. 21, 2015 and published in English as WO 2016/020641 A1 on Feb. 11, 2016. This application is based on and claims the benefit of priority from Great Britain Patent Application No. 1414108.9 filed on Aug. 8, 2014. The entire disclosures of all of the above applications are incorporated herein by reference.

TECHNICAL FIELD

The present invention relates to a method for manufacture of capacitive touch panels, in particular the method relates to the scribing of patterns on two conductive layers, on opposite sides of a substrate, of a two layer projective capacitive touch panel.

BACKGROUND ART

Capacitive touch panel technology is in wide use, for example in mobile phones, satellite navigation systems, PDA screens and handheld games consoles.

One particular form of capacitive touch panel is known as projective capacitive touch technology or "PCT". In PCT devices, an XY array of sensing electrodes is formed in layers of transparent conducting material. In use, capacitance forms between the user's fingers and the projected capacitance from the sensing electrodes. A touch is made, precisely measured and translated into a command which is executed by underlying electronic devices for an appropriate software application. PCT screens enjoy the benefits of responding accurately to both fingers and styli.

One particular form of PCT technology has two separated layers of transparent conducting material and it is the changes in the mutual capacitance between the electrodes at the intersection points of the electrode array layer that are detected.

The layers of transparent conductive material are each divided into a plurality of discrete electrode cells which are electrically connected in a first orthogonal direction but electrically isolated in a second orthogonal direction. The scribed pattern may be the same for both layers or may be different.

Conventionally, in a capacitive touch panel using PCT technology, a transparent substrate has deposited on each of its opposite surfaces a layer of transparent electrically conducting material. An electrode pattern is scribed in each of the layers of transparent electrically conducting material using two separate lasers. Each laser scribes a pattern by focusing on the surface of the substrate closest to it, so-called near-side ablation. Patent application GB 08003305.3 describes such a method. Alternatively a single laser is used and the substrate may need to be turned over and the device aligned to carry out the scribing process for the second layer. Where the electrode pattern is desired to be identical on the two surfaces, a single laser can be focused between the two layers and its parameters selected to provide scribing in each of the two layers simultaneously without damage to the transparent substrate. It will be appreciated this one laser process cannot be used to provide different patterns on the two layers. This process is described in JP 8320638A and US 2008/129318 A.

WO 2011/018595 describes a process for providing scribing of different electrode patterns on both of the electrically conductive layers of a PCT touch panel, without the need for a second laser or to turn the substrate. This is achieved by changing the focal length of the laser optics from a point at the surface of the substrate closest to the laser to a point at the surface of the substrate farthest from the laser, to perform so-called far-side ablation. Conventionally, near-side ablation is the preferred mechanism by which to scribe an electrode pattern in an electrically conductive layer of a PCT touch panel. This is because laser power is attenuated by the glass substrate. The method described in WO 2011/018595 is an exception to this convention, which accepts laser attenuation in order to simplify the process by removing the need for a second laser or to turn the substrate and then recalibrate the laser.

SUMMARY OF INVENTION

The present invention aims, amongst other things, to provide an alternative method for manufacture of capacitive touch panels which has a higher yield in comparison to existing methods.

According to an aspect of the invention, there is provided a method for laser scribing first and second transparent electrically conductive layers deposited on respective opposing first and second surfaces of a transparent substrate, comprising: directing a first laser beam through one or more lenses to a focal spot on or closely adjacent to the first surface of the substrate, such that the focusing laser beam passes through the second electrically conductive layer and the second surface of the substrate; initiating relative movement between the first laser beam and the substrate in two axes in a plane orthogonal to the axis of the first laser beam to scribe a first pattern in the first electrically conductive layer; directing a second laser beam through one or more lenses to a focal spot on or closely adjacent to the second surface of the substrate, such that the focusing laser beam passes through the first electrically conductive layer and the first surface of the substrate; initiating relative movement between the second laser beam and the substrate in two axes in a plane orthogonal to the axis of the second laser beam to scribe a second pattern in the second electrically conductive layer.

The first laser beam and the second laser beam may be the same and the method may further comprise: moving the substrate or the laser beam from a position where the second surface of the substrate faces the laser beam to a position where the first surface of the substrate faces the laser beam, after scribing the first pattern in the first electrically conductive layer. The first laser beam and the second laser beam may be emitted from opposite sides of the substrate. The scribing of the first and second electrically conductive layers by the first and second laser beams may occur simultaneously. The first and second laser beams may have a wavelength in the range 1000 nm to 1100 nm. The first pattern scribed in the first electrically conducting layer may be different from the second pattern scribed in the second electrically conducting layer or the first pattern may be identical to the second pattern.

According to another aspect of the invention, the threshold energy density at which the first laser beam can remove the first electrically conductive layer from the substrate is lower than the threshold energy density at which the first laser beam can remove the second electrically conductive layer from the substrate, the threshold energy density at which the second laser beam can remove the second electrically conductive layer from the substrate is lower than the threshold energy density at which the second laser beam can remove the first electrically conductive layer from the substrate.

According to another aspect of the invention, the energy density of the first laser beam at a position corresponding to the first electrically conducting layer exceeds the threshold energy density required for the first laser beam to remove the first electrically conducting layer from the substrate and the energy density of the first laser beam at a position corresponding to the second electrically conductive layer does not exceed the threshold energy density required for the first laser beam to remove the second electrically conducting layer from the substrate, and the energy density of the second laser beam at a position corresponding to the second electrically conducting layer exceeds the threshold energy density required for the second laser beam to remove the second electrically conducting layer from the substrate and the energy density of the second laser beam at a position corresponding to the first electrically conductive layer does not exceed the threshold energy density required for the second laser beam to remove the first electrically conducting layer from the substrate.

A process window for the scribing the first or second electrically conducting layers with the first or second laser beams respectively may be greater than a process window for scribing the first or second electrically conducting layer with the second or first laser beams respectively, where the process window is defined as the range of focal positions of the laser beam relative to the target electrically conducting layer to be scribed, over which the laser beam can scribe the target electrically conducting layer without scribing the opposite electrically conducting layer.

A process window for scribing the first or second electrically conducting layers with the first or second laser beams respectively exceeds the variance in the position of the target electrically conducting layer to be scribed in the direction the scribing laser beam axis, and/or the variance in the position of the focal plane of the scribing laser beam in the direction of the scribing laser beam axis, or the combined variance in the position of the target electrically conducting layer to be scribed in the direction the scribing laser beam axis and the variance in the position of the focal plane of the scribing laser beam in the direction of the scribing laser beam axis.

The first and second electrically conducting layers may be formed from the same material. The first and second electrically conducting layers may be formed from Indium Tin Oxide. The substrate thickness is preferably equal to or less than 1.5 mm.

The method may further comprise directing the first laser beam through the one or more lenses to a focal spot on or closely adjacent to the second surface of the substrate; initiating relative movement between the first laser beam and the substrate in two axes in a plane orthogonal to the axis of the first laser beam to scribe a third pattern in a first metal layer disposed on the second electrically conductive layer or between the second electrically conductive layer and the substrate; directing the second laser beam through the one or more lenses to a focal spot on or closely adjacent to the first surface of a substrate; initiating relative movement between the second laser beam and the substrate in two axes in a plane orthogonal to the axis of the first laser beam to scribe a fourth pattern in a second metal layer disposed on the first electrically conductive layer or between the first electrically conductive layer and the substrate.

BRIEF DESCRIPTION OF DRAWINGS

Other aims and features of the present invention will be described below with reference to the accompanying drawings in which.

DETAILED DESCRIPTION

Figure 1:
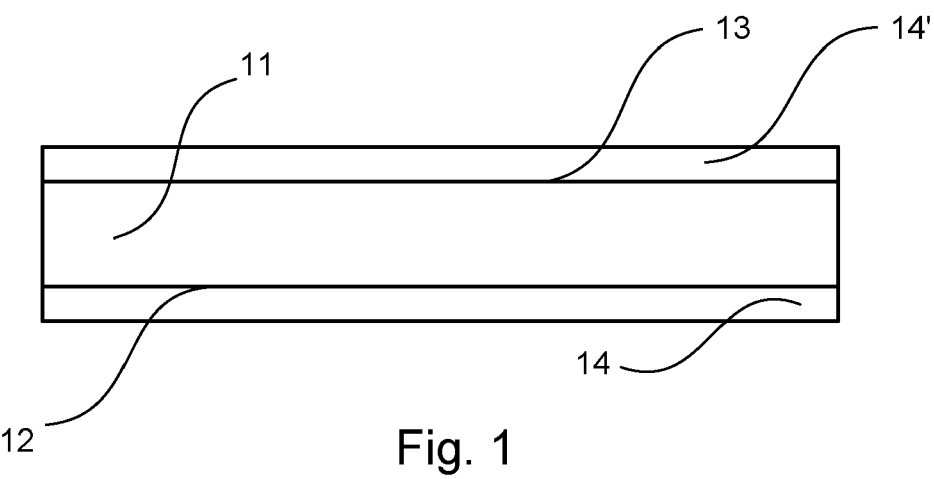
FIG. 1 shows a substrate used in the invention.

FIG. 1 shows a substrate typically used in PCT technology such as the present invention. The substrate 11 used for a typical two layer capacitive touch panel is transparent and may be rigid and may be made of glass or other inorganic transparent material (e.g. silica) or may be flexible and may be made of a polymer such as Polyester (PET) or polycarbonate (PC) or thin flexible glass (TFG). The thickness of the substrate is typically in the range of 0.3 mm to 1.5 mm. A layer 14, 14' that is both transparent and electrically conducting is applied to both surfaces 12, 13 of the substrate. Typically these are thin layers of an inorganic oxide material such as Indium Tin Oxide (ITO) or other transparent conductive oxide (TCO). Other transparent conducting layers based on organic materials or nano-particle materials may be used as an alternative. For capacitive touch panels typical layer thicknesses are in the range 50 nm to several 100 nm, with surface resistivities in the range 50 to 150 ohms per square. We refer to these transparent conducting materials as TCMs from now on in this specification. Both surfaces 12, 13 of the substrate 11 may be coated with the same TCM. Preferably, both surfaces 12, 13 may be coated with ITO as the electrically conducting layers 14, 14'. Further the substrate thickness is preferably equal to or less than 1.5 mm. More preferably, the substrate thickness is between around 0.5 mm and around 1.0 mm. Preferably still, the substrate thickness is around 0.7 mm.

In order to form discrete electrodes in the TCM coatings, a pattern is scribed in the TCM coatings using a pulsed laser beam. The wavelength of the laser beam is generally chosen so that the beam can pass through the substrate 11 without significant absorption but that some laser energy is absorbed by the TCM coatings. Typically the laser beam has an infrared or ultraviolet central wavelength, usually within the ranges 1000 nm-1100 nm and 350 nm-360 nm respectively but other wavelengths are also possible. The laser beam is typically focused to a point by one or more lenses. The energy density of the laser beam changes with the distance from the focusing optics. The energy density is a maximum at the focal point and decreases away from the focal point as the laser beam diverges. The pulsed laser is focused on a point at or close to a TCM coating and the laser power and pulse energy is adjusted so that the TCM absorbs sufficient energy to ablate it from the substrate surface. The substrate 11 and laser beam are moved relative to each other in two axes in a plane perpendicular to the laser beam axis to scribe lines to create the required electrically isolated electrode pattern.

In the method of JP 8320638A and US 2008/129318 A, the laser beam is focused within the substrate, between two TCM coatings on opposing sides of the substrate. The laser beam parameters are selected such that the energy density of the laser beam at positions corresponding to the TCM coatings is sufficient to ablate the TCM layers to remove them from the substrate surface. In GB 08003305.3 the laser beam is focused at the near-side TCM coating, closest to where the laser beam is emitted. The laser beam parameters are selected such that the maximum energy density exceeds the threshold required to ablate the TCM from the near-side surface of the substrate. The divergence of the laser beam as it passes through the substrate ensures that the energy density at a position of the other TCM coating, on the opposite surface of the substrate, is not sufficient to ablate the TCM from the surface of the substrate. In WO 2011/018595, the method of GB 08003305.3 is used to form an electrode pattern in the TCM coating on a first surface of the substrate. The electrode pattern is formed in the TCM coating on the second surface of the substrate by increasing the focal length of the focusing optical system or by moving the focussing lens towards the substrate so as to focus the laser beam through the substrate onto the TCM coating on the second surface of the substrate. The laser beam parameters are selected such that the maximum energy density exceeds the threshold required to ablate the TCM from the far-side surface of the substrate. The convergence of the focusing laser beam as it passes through the substrate ensures that the energy density at a position of the TCM coating on the first surface of the substrate is not sufficient to ablate the TCM coating from the first surface of the substrate. In each of the above mentioned patent documents, the processes described assume similar ablation thresholds for the TCM coatings on either side of the substrate and rely on the divergence of the laser beam to ensure that the TCM coating on only one side of the substrate is ablated. If the substrate is sufficiently thick, this is not a problem. However, if the substrate is thin (e.g. less than 0.3 mm) then this process does not work because there will be insufficient variation in energy density across the thickness of the substrate.

Figure 2:
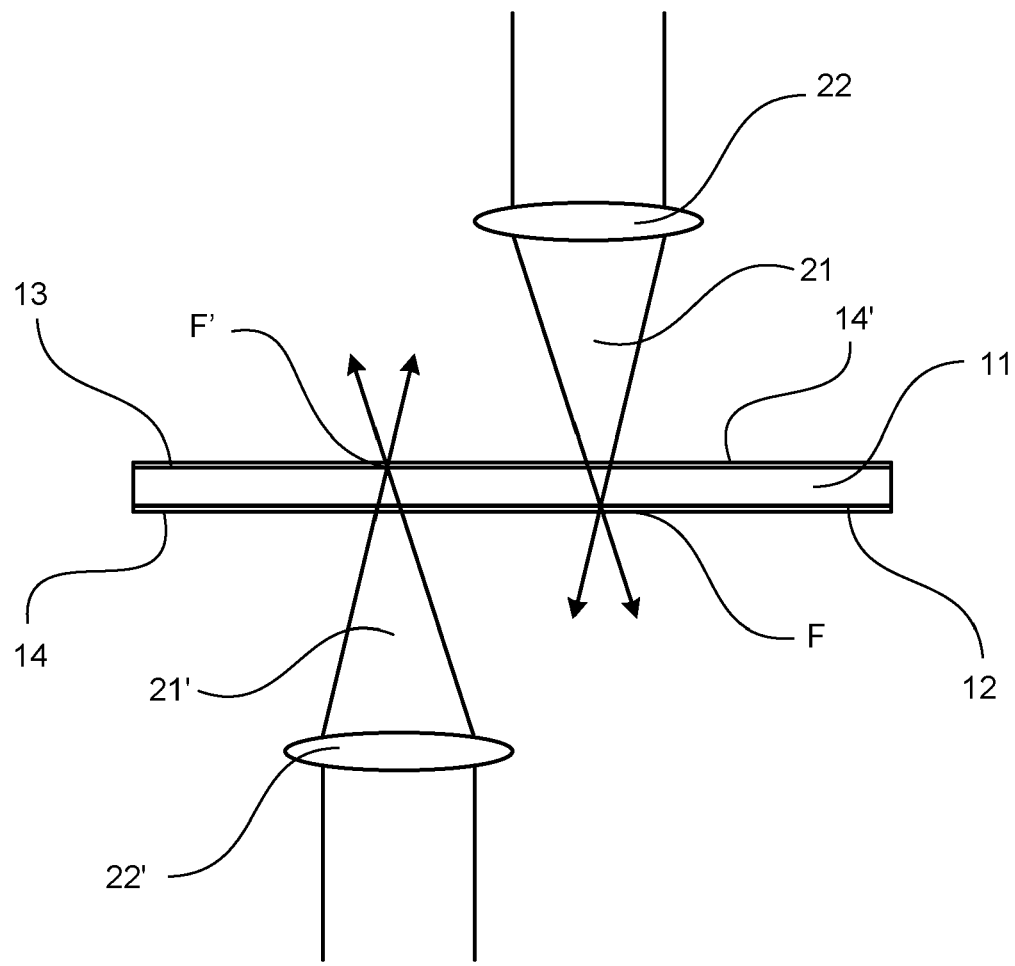
FIG. 2 shows a process according to a first embodiment of the invention.

FIG. 2 shows a process for laser scribing first and second transparent electrically conductive layers (TCM coatings) 14, 14' deposited on respective opposing first and second surfaces 12, 13 of a transparent substrate 11 according to a first embodiment of the present invention. As can be seen, a first laser beam 21 is directed through one or more lenses 22 to a focal spot F on or closely adjacent to the first surface 12 of the substrate 11, such that the focusing laser beam 21 passes through the second electrically conductive layer 14' and the second surface 13 of the substrate 11. In addition, a second laser beam 21' is directed through one or more lenses 22' to a focal spot F' on or closely adjacent to the second surface 13 of the substrate 11, such that the focusing laser beam 21' passes through the first electrically conductive layer 14 and the first surface 12 of the substrate 11. The laser beams 21, 21' then scribes an electrode pattern in the electrically conductive layer 14, 14'.

Figure 3A:
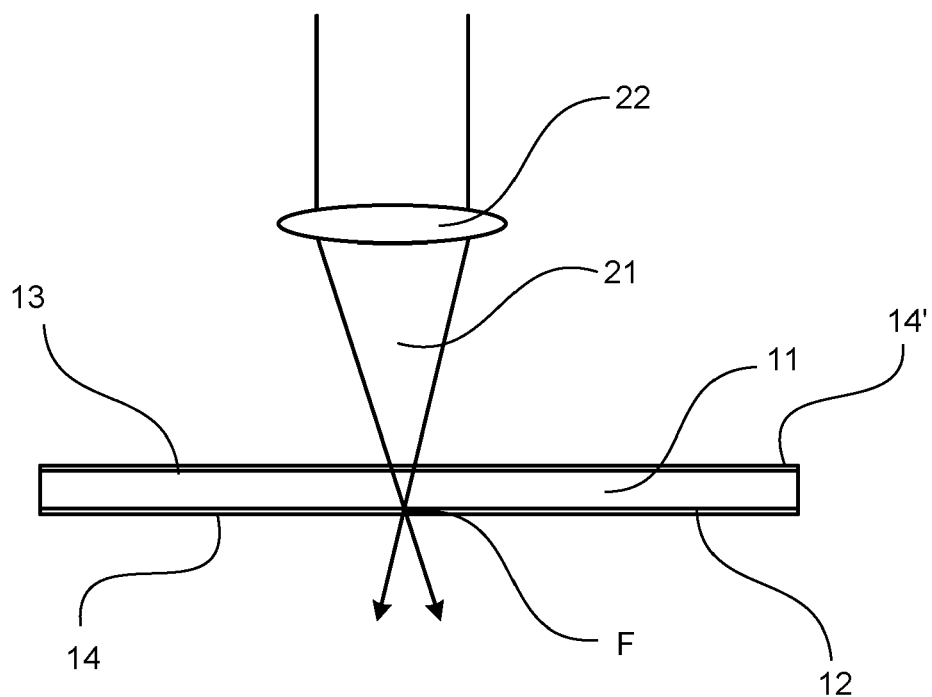
FIGS. 3A and 3B show a process according to a second embodiment of the invention.
Figure 3B:
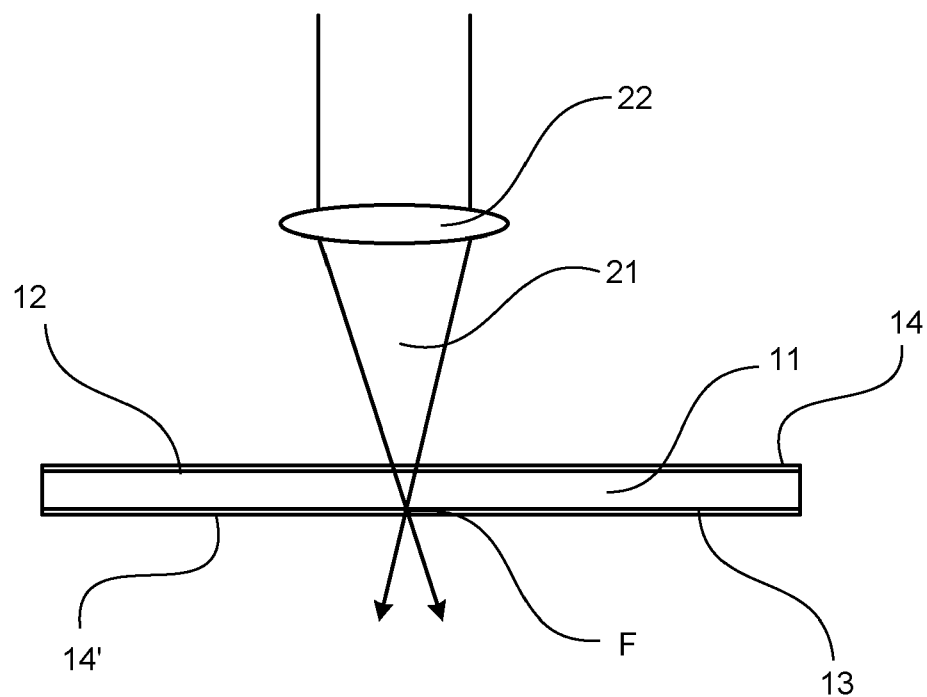

FIGS. 3A and 3B show a process for laser scribing first and second transparent electrically conductive layers 14, 14' deposited on respective opposing first and second surfaces 12, 13 of a transparent substrate 11 according to a second embodiment of the present invention. As can be seen in FIG. 3A, a first laser beam 21 is directed through one or more lenses 22 to a focal spot F1 on or closely adjacent to the first surface 12 of the substrate 11, such that the focusing laser beam 21 passes through the second electrically conductive layer 14' and the second surface 13 of the substrate 11. The substrate 11 is then moved from a position where the second surface 13 of the substrate 11 faces the laser beam 21 to a position where the first surface 12 of the substrate 11 faces the laser beam 21, after scribing the electrode pattern in the first electrically conductive layer 14. Then, as shown in FIG. 3B, the laser beam 21 is directed through the one or more lenses 22 to the focal spot F on or closely adjacent to the second surface 13 of the substrate 11, such that the focusing laser beam 21 passes through the first electrically conductive layer 14 and the first surface 12 of the substrate 11. The laser beam 21 then scribes an electrode pattern in the second electrically conductive layer 14'.

In each of the processes described above, the TCM coatings on both sides of the substrate are subjected to far-side ablation, wherein the TCM coating on the side of the substrate farthest from where the laser beam is emitted is targeted by the laser beam and ablated.

Experiments were conducted to ascertain the typical ITO ablation thresholds for near-side and far-side TCM coatings for different combinations of laser beam wavelength, laser beam pulse duration, substrate material, substrate thickness and ITO sheet resistance. The results are shown in Table 1. The results show that for certain combinations of parameters the ablation threshold for the far-side TCM coating is significantly lower than for the near-side TCM coating. The reason for this unexpected result is thought to lie in the different mechanisms by which the laser beam interacts with the TCM coating on the near-side surface of the substrate and the TCM coating on the far-side surface of the substrate. In the case of the far-side TCM coating, the laser beam can act directly at the TCM-substrate interface which means the laser beam can delaminate the TCM coating from the substrate. In the case of the near-side TCM coating, the laser has to pass through the TCM coating to reach the TCM-substrate interface, thus energy may be attenuated by the TCM coating and by any ejected material in the plume above the TCM coating, if the coating is being vaporised. Essentially, it may take more energy to vaporise the TCM coating than delaminate it. Additionally, the ability to delaminate the TCM coating from the substrate is effected by factors such as the bond strength between the TCM coating and the substrate. Therefore, the ablation thresholds will also depend on the laser parameters and the type of substrate and TCM.

TABLE 1

| Laser | Substrate | ITO Sheet resistance | Near-side threshold | Far-side threshold |
| --- | --- | --- | --- | --- |
| IR ps laser | 0.55 soda-lime | 90 ohm/sq | 0.68 J/cm$^2$ | 0.40 J/cm$^2$ |
| IR ps laser | 0.21 soda-lime | 50 ohm/sq | 0.46 J/cm$^2$ | 0.31 J/cm$^2$ |
| IR ns laser | 0.21 soda-lime | 50 ohm/sq | 3.00 J/cm$^2$ | 1.90 J/cm$^2$ |
| UV ns laser | 0.21 soda-lime | 50 ohm/sq | 0.51 J/cm$^2$ | 0.70 J/cm$^2$ |
| UV ns laser | 0.7 Gorilla glass | 50 ohm/sq | 0.43 J/cm$^2$ | 0.42 J/cm$^2$ |
| UV ps laser | 0.7 Gorilla glass | 50 ohm/sq | 0.71 J/cm$^2$ | 0.67 J/cm$^2$ |
| IR ps laser | 0.7 Gorilla glass | 50 ohm/sq | 0.37 J/cm$^2$ | 0.26 J/cm$^2$ |

The combinations of laser beam, substrate and TCM coating parameters used in the methods shown in FIGS. 2 and 3, and described above, may be selected such that the threshold for near-side ablation is higher than the threshold for far-side ablation. This means that the energy density of the laser beam 21, 21' at the respective positions of the near-side TCM coating and far-side TCM coating may be sufficient to ablate the far-side TCM coating (i.e. above the threshold for far-side ablation) but not sufficient to ablate the near-side TCM coating (i.e. below the threshold for near-side ablation). Selecting the parameters in this way allows different electrode patterns to be formed on each side 12, 13 of the substrate 11 even for thin substrates, using a far-side ablation process. This is because the difference in ablation threshold prevents the near-side TCM coating being removed.

Further, due to the increased difference in ablation threshold between near-side and far-side ablation, a process window can be increased by using a far-side ablation process. The process window is defined as the range of focal positions of the laser beam relative to the target substrate surface to be scribed, over which the scribing process is effective i.e. over which the first or second laser beam can scribe the first or second electrically conducting layers respectively without scribing the opposite layer. Therefore, it is preferable that the combinations of laser beam, substrate and TCM coating parameters are selected such that the process window for far-side ablation for that combination of parameters exceeds the process window for near-side ablation for that combination of parameters.

The increased size of the process window enables the process to work in a high yielding way. This is because it is easier to keep the substrate 11 in the process window over its full expanse. To allow access of the laser beams, and to prevent contamination by any supporting material under laser irradiation, the substrate may not be supported across its width, therefore the substrate is likely not to be very flat, i.e. the position of the substrate 11 and TCM coatings have some height variance in the direction of the laser beam axis (z-axis direction). With a small process window, deviation in the position of the substrate 11 caused by curvature, due to the manner in which it is supported, can result in portions of the substrate 11 being positioned outside the process window which results in a lower process yield. Further, the focal plane of the laser beam is not perfectly flat, a larger process window can accommodate the change in energy density of the laser beam due to variance in the position of the focal plane in the direction of the laser beam axis (z-axis direction).

For the case of a 50 ohm/sq ITO coating on a 0.7 mm thick soda-lime float glass substrate using a pulsed infrared laser with a wavelength of 1030-1064 nm and a pulse duration of 10-15 ns a process window of 1.4 mm was established for a far-side ablation process. The process window for a near-side ablation process for the same parameters was 0.3 mm. Using an ultraviolet nanosecond pulsed laser, the process window was found to be around 0.4 mm for both near-side and far-side ablation. The improvement in the size of the process window achieved by the above example is significant. Therefore, using a far-side ablation process on both sides 12, 13 of the substrate 11, as is the case in the present invention, can significantly improve the process yield. Preferably, the laser beam, substrate and TCM characteristics should be selected to give a process window exceeding the height variance of the substrate surface in the z-axis direction and/or the variance in the position of the focal plane of the scribing laser beam in the z-axis direction, or, preferably, the combined variance of the substrate surface position in the z-axis direction and the position of the focal plane of the scribing laser beam in the z-axis direction.

Figure 4A:
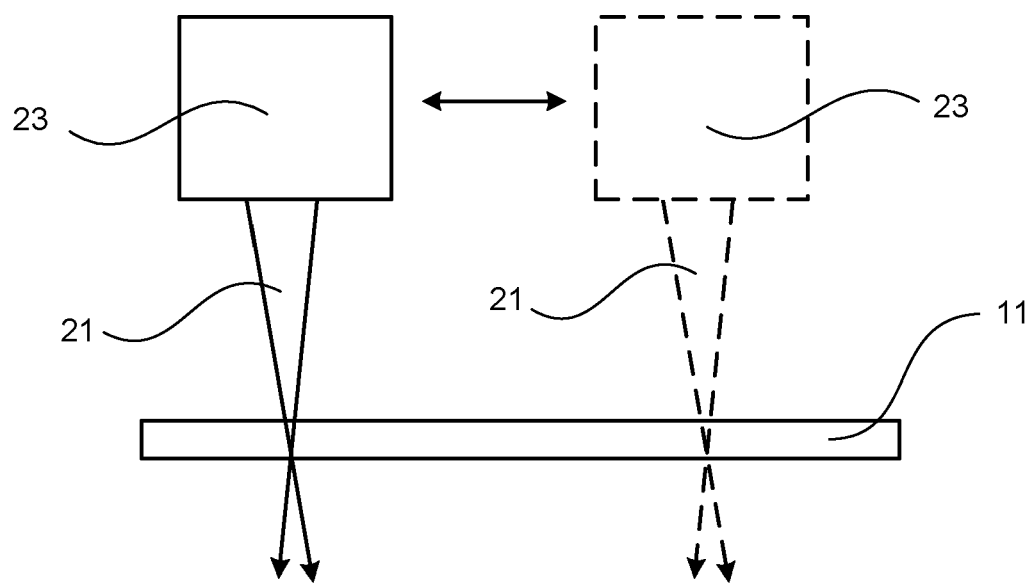
FIG. 4A shows a first method for scribing an electrode pattern.
Figure 4B:
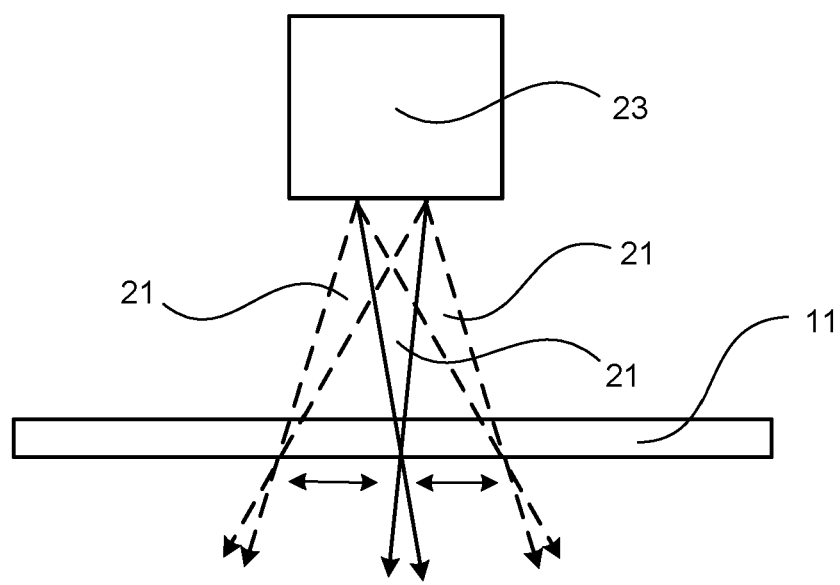
FIG. 4B shows a second method for scribing an electrode pattern.

In each of the embodiments shown in FIGS. 2 and 3, relative movement between the laser beam 21, 21' and the substrate 11 in two axes in a plane orthogonal to the axis of the first laser beam is initiated to scribe an electrode pattern in the electrically conductive layers (TCM coatings) 14, 14'. This relative movement may be initiated by translational movement between the laser beam 21, 21' and the substrate 11 in a plane perpendicular to the laser beam or by scanning the laser beam 21, 21' over the surface of the substrate 11, as illustrated respectively in FIGS. 4A and 4B, or a combination of both. As shown in FIG. 4A, the laser beam 21 moves in a plane parallel to the substrate 11. As shown in FIG. 4B, the laser beam is deflected in a radial direction perpendicular to the axis of the laser beam 21 to different positions on the substrate 11. In the case of the embodiment shown in FIG. 2, the TCM coating on the opposite side of the substrate 11 is ablated in the same way but this is not shown in the Figures. The electrode patterns scribed on each side 12, 13 of the substrate 11 are scribed independently therefore they may be the same or they may be different, depending on the characteristics required of the final product. FIGS. 4A and 4B also show a laser module 23, which emits the laser beam 21 and contains reflective and or refractive optical elements for focusing and directing the laser beam 21, for example it may include the focusing lens or lenses 21.

PCT devices may also include a layer of metal in the edge border regions of the array of sensing electrodes. This metal layer can be deposited either on top of the deposited TCM or alternatively can be applied to the substrate before the TCM coating is deposited such that it is situated between the substrate and the TCM coating. The metal layer is generally applied by a process such as Physical Vapour Deposition (PVD), screen printing or inkjet printing. The metal layer is also scribed using a laser beam, however, unlike the TCM coating, the metal layer is not suitable for far-side ablation. Therefore the metal layer must be scribed using a near-side ablation process. The metal layer may be formed on both sides of the substrate. If the TCM coating is scribed using a far-side process the laser beam may be refocused in order to scribe the metal layer on the opposite side of the substrate. In the process shown in FIG. 2, with two laser beams scribing simultaneously, the metal layers can be scribed after the TCM coatings by refocusing the laser beams at the near-side substrate surface so that the first laser beam scribes the metal layer on the second side of the substrate and the second laser beam simultaneously scribes the metal layer on the first side of the substrate. Alternatively the metal layers may be scribed before the TCM coatings. In the process shown in FIGS. 3A and 3B, with a single laser beam, first the TCM coating on the first side of the substrate is scribed, then the laser is refocused, then the metal layer on the second side of the substrate is scribed, then the laser is refocused and the substrate is turned over, then the TCM coating on the second side of the substrate is scribed, then finally the metal layer on the first side of the substrate is scribed. Alternatively, the order in which the TCM coatings and metal layers are scribed may be different. Any order can be used, turning over the substrate whenever necessary.

The invention claimed is:

1. A method for laser scribing first and second transparent electrically conductive layers deposited on respective opposing first and second surfaces of a transparent substrate, comprising:

directing a first laser beam through one or more lenses to a focal spot on or closely adjacent to the first surface of the substrate such that an energy density of the first laser beam is higher at the first surface of the transparent substrate than at the second surface of the transparent substrate, the first surface of the substrate being located on a far side of the substrate relative to the first laser beam such that the focusing laser beam passes through the second electrically conductive layer and the second surface of the substrate;

initiating relative movement between the first laser beam and the substrate in two axes in a plane orthogonal to the axis of the first laser beam to scribe a first pattern in the first electrically conductive layer;

directing a second laser beam through one or more lenses to a focal spot on or closely adjacent to the second surface of the substrate such that an energy density of the second laser beam is higher at the second surface of the transparent substrate than at the first surface of the transparent substrate, the second surface of the substrate being located on a far side of the substrate relative to the second laser beam such that the focusing laser beam passes through the first electrically conductive layer and the first surface of the substrate; and initiating relative movement between the second laser beam and the substrate in two axes in a plane orthogonal to the axis of the second laser beam to scribe a second pattern in the second electrically conductive layer;

wherein the first laser beam, the transparent substrate, and the first and second electrically conductive layers are mutually selected such that the threshold energy density at which the first laser beam is operable remove the first electrically conductive layer from the substrate is lower than the threshold energy density at which the first laser beam can remove the second electrically conductive layer from the substrate, and a first process window for the scribing of the first electric conductive layer with the first laser beam is greater than a process window for scribing the second electrically conductive layer with the first laser beam, the second laser beam, the transparent substrate, and the first and second electrically conductive layers are mutually selected such that the threshold energy density at which the second laser beam is operable to remove the second electrically conductive layer from the substrate is lower than the threshold energy density at which the second laser beam can remove the first electrically conductive layer from the substrate, and a second process window for the scribing of the second electrically conductive layer with the second laser beam is greater than a process window for scribing the first electrically conductive layer with the second laser beam, where the process window is defined as the range of focal positions of the laser beam relative to the target electrically conductive layer to be scribed, over which the laser beam can scribe the target electrically conductive layer without scribing the opposing electrically conductive layer, and the first and second laser beams, the transparent substrate, and the first and second electrically conductive layers are selected such that the first and second process windows each exceed a height variance of a respective transparent substrate surface in a height direction and/or exceed a height variance of the position of the focal plane of the respective first and second laser beams, the height direction being perpendicular to a respective substrate surface.

2. The method of claim 1, wherein the first laser beam and the second laser beam are the same and the method further comprises:

moving the substrate from a position where the second surface of the substrate faces the laser beam to a position where the first surface of the substrate faces the laser beam, after scribing the first pattern in the first electrically conductive layer.

3. The method of claim 1, wherein the first laser beam and the second laser beam are applied from opposite sides of the substrate.

4. The method of claim 3, wherein the scribing of the first and second electrically conductive layers by the first and second lasers occurs simultaneously.

5. The method of claim 1, wherein the first and second laser beams have a wavelength in the range of 1000 nm to 1100 nm.

6. The method of claim 1, wherein the first pattern is different from the second pattern.

7. The method of claim 1, wherein the first pattern is identical to the second pattern.

8. The method of claim 1, wherein the energy density of the first laser beam at a position corresponding to the first electrically conducting layer exceeds the threshold energy density required for the first laser beam to remove the first electrically conducting layer from the substrate and the energy density of the first laser beam at a position corresponding to the second electrically conductive layer does not exceed the threshold energy density required for the first laser beam to remove the second electrically conducting layer from the substrate, and the energy density of the second laser beam at a position corresponding to the second electrically conducting layer exceeds the threshold energy density required for the second laser beam to remove the second electrically conducting layer from the substrate and the energy density of the second laser beam at a position corresponding to the first electrically conductive layer does not exceed the threshold energy density required for the second laser beam to remove the first electrically conducting layer from the substrate.

9. The method of claim 1, wherein the first and second electrically conducting layers are formed from the same material.

10. The method of claim 9, wherein the first and second electrically conducting layers are formed from Indium Tin Oxide.

11. The method of claim 1, wherein the substrate thickness is equal to or less than 1.5 mm.

12. The method of claim 1, further comprising:

directing the first laser beam through the one or more lenses to a focal spot on or closely adjacent to the second surface of the substrate;

initiating relative movement between the first laser beam and the substrate in two axes in a plane orthogonal to the axis of the first laser beam to scribe a third pattern in a first metal layer disposed on the second electrically conductive layer or between the second electrically conductive layer and the substrate;

directing the second laser beam through the one or more lenses to a focal spot on or closely adjacent to the first surface of the substrate;

initiating relative movement between the second laser beam and the substrate in two axes in a plane orthogonal to the axis of the first laser beam to scribe a fourth pattern in a second metal layer disposed on the first electrically conductive layer or between the first electrically conductive layer and the substrate.

* * * * *